(12) United States Patent
Herrington et al.

(10) Patent No.: US 10,590,549 B2
(45) Date of Patent: Mar. 17, 2020

(54) SALT DISSOLVER

(71) Applicant: Aqua Research LLC, Albuquerque, NM (US)

(72) Inventors: Rodney E Herrington, Albuquerque, NM (US); V Gerald Grafe, Corrales, NM (US)

(73) Assignee: Aqua Research LLC, Albuquerque, NM (US)

( * ) Notice: Subject to any disclaimer, the term of this patent is extended or adjusted under 35 U.S.C. 154(b) by 92 days.

(21) Appl. No.: 15/737,313

(22) PCT Filed: Jun. 12, 2016

(86) PCT No.: PCT/US2016/037123
§ 371 (c)(1),
(2) Date: Dec. 17, 2017

(87) PCT Pub. No.: WO2016/205094
PCT Pub. Date: Dec. 22, 2016

(65) Prior Publication Data
US 2018/0171490 A1    Jun. 21, 2018

Related U.S. Application Data

(60) Provisional application No. 62/181,683, filed on Jun. 18, 2015.

(51) Int. Cl.
| | |
|---|---|
| *C25B 9/06* | (2006.01) |
| *C25B 15/02* | (2006.01) |
| *C25B 1/26* | (2006.01) |
| *C02F 1/467* | (2006.01) |

(52) U.S. Cl.
CPC ............. *C25B 9/06* (2013.01); *C02F 1/4672* (2013.01); *C02F 1/4674* (2013.01); *C25B 1/26* (2013.01); *C25B 15/02* (2013.01); *C02F 2201/4614* (2013.01); *C02F 2201/4618* (2013.01); *C02F 2201/4619* (2013.01); *C02F 2303/04* (2013.01)

(58) Field of Classification Search
CPC ... C25B 9/06; C25B 1/26; C25B 15/08; C02F 1/4674; C02F 1/46104; C02F 2201/4618
See application file for complete search history.

(56) References Cited

U.S. PATENT DOCUMENTS

| | | |
|---|---|---|
| 4,511,440 A | 4/1985 | Saprokhin |
| 4,793,909 A | 12/1988 | Maddock |
| 5,053,114 A | 10/1991 | Maddock |
| 5,753,098 A | 5/1998 | Bess |

(Continued)

*Primary Examiner* — Nicholas A Smith
(74) *Attorney, Agent, or Firm* — C Gerald Grafe

(57) ABSTRACT

The present invention provides an oxidant production apparatus, an example embodiment of which comprises a water container configured to accept and retain a volume of water; a porous salt container configured to accept and retain a quantity of salt, mounted with the water container such that salt in the salt container is in fluid communication with water in the water container; an electrolysis system mounted with the water container; and a gas directing element mounted with the salt container and the water container such that gas generated by the electrolysis system is preferentially directed through the salt container. In operation, gas from electrolysis percolates through the water and the salt, agitating the salt and encouraging the salt to fully dissolve.

6 Claims, 4 Drawing Sheets

(56) References Cited

U.S. PATENT DOCUMENTS 6,558,537 B1 * 5/2003 Herrington ............ B01D 61/04
                                                210/192
2006/0157342 A1   7/2006 Herrington

* cited by examiner

SALT DISSOLVER

FIELD OF THE INVENTION

The present invention relates to an electrolytic cell producing oxidants that utilizes gas generated in the process to help dissolve the salt for the brine in the process.

BACKGROUND

Electrolytic technology utilizing dimensionally stable anodes (DSA) has been used for years for the production of chlorine and other mixed-oxidant solutions. Dimensionally stable anodes are described in U.S. Pat. No. 3,234,110 to Beer, entitled "Electrode and Method of Making Same," whereby a noble metal coating is applied over a titanium substrate.

An example of an electrolytic cell with membranes is described in U.S. Pat. No. RE 32,077 to deNora, et al., entitled "Electrode Cell with Membrane and Method for Making Same," whereby a circular dimensionally stable anode is utilized with a membrane wrapped around the anode, and a cathode concentrically located around the anode/membrane assembly.

An electrolytic cell with dimensionally stable anodes without membranes is described in U.S. Pat. No. 4,761,208 to Gram, et al., entitled "Electrolytic Method and Cell for Sterilizing Water."

Commercial electrolytic cells have been used routinely for oxidant production that utilize a flow-through configuration that may or may not be under pressure that is adequate to create flow through the electrolytic device. Examples of cells of this configuration are described in U.S. Pat. No. 6,309,523 to Prasnikar, et al., entitled "Electrode and Electrolytic Cell Containing Same," and U.S. Pat. No. 5,385,711 to Baker, et al., entitled "Electrolytic Cell for Generating Sterilization Solutions Having Increased Ozone Content," and many other membrane-type cells.

In other configurations, the oxidant is produced in an open-type cell or drawn into the cell with a syringe or pump-type device, such as described in U.S. Pat. No. 6,524,475 to Herrington, et al., entitled "Portable Water Disinfection System."

U.S. patent application Ser. No. 09/907,092 to Herrington, et al., entitled "Portable Water Disinfection System," describes disinfection devices that utilize, in one instance, a cell chamber whereby hydrogen gas is generated during electrolysis of an electrolyte, and provides the driving force to expel oxidant from the cell chamber through restrictive check valve type devices. In this configuration, unconverted electrolyte is also expelled from the body of the cell as hydrogen gas is generated. In an alternate configuration in the same application, hydrogen gas pressure is contained in a cell chamber during electrolysis, but the pressure within the cell chamber is limited by the action of a spring loaded piston that continues to increase the volume of the cell chamber as gas volume increases. Ultimately, a valve mechanism opens, and the spring-loaded piston fills the complete volume of the cell chamber forcing the oxidant out of the cell chamber.

U.S. Pat. No. 7,005,075 to Herrington, et al., entitled "Gas Drive Electrolytic Cell," teaches a disinfection device that incorporates an electrolyte solution and a gas head space within a closed electrolytic cell chamber. During electrolysis of electrolyte to a disinfectant solution, hydrogen gas is generated within the closed electrolytic cell thereby generating pressure within the closed cell. Upon completion of electrolysis of the electrolyte solution to produce the disinfectant solution, a discharge port on the electrolytic cell housing is opened. Gas pressure within the cell housing provides the motive force to expel all or most of the disinfectant out of the cell housing to such a point where the disinfectant solution is utilized. By definition, this device operates in batch mode.

Other inventions that utilize gas pressure generated from electrolysis are also described in the literature. U.S. Pat. No. 4,138,210, to Avedissian, entitled "Controlling the Pressure of a Gas Generator," describes a gas torch that utilizes an electrolytic mechanism for generating and controlling pressure of hydrogen gas that is used as the feed gas for the torch. U.S. Pat. No. 5,221,451 to Seneff, et al., entitled "Automatic Chlorinating Apparatus," describes a chlorine gas generating cell that operates at the same pressure as the treated water flow stream. Water under pressure flows through the closed cell and replenishes the electrolyte level in the cell. Partitions within the electrolytic cell maintain separation of the chlorine gas that is aspirated in the water stream. Chlorine and hydrogen gas generated within the cell maintain a pressure balance between the chlorine gas phase and the pressure of the liquid water flowing through the cell so that unconverted electrolyte is not drawn into the flowing water stream. U.S. Pat. No. 5,354,264 to Bae, et al., entitled "Gas Pressure Driven Infusion System by Hydrogel Electrolysis," describes a system that generates and controls the production of oxygen and hydrogen gas in an electrolytic hydrogel process for the purpose of closely regulating the amount of liquid drugs that are delivered under gas pressure to the human body.

Inventions that use a gas bubble lift mechanism from boiling water, as in coffee makers, are also described in the literature. U.S. Pat. No. 4,331,067 to Mysicka et al., entitled "Coffeemaker", and U.S. Pat. No. 4,744,291 to Wallin, entitled "Electric Coffee Maker" describe electric percolator type of coffee makers that utilize an electric heating coil with a check valve in the suction side of the coil. As water is boiled in the coil at the bottom of the coffee maker, the water vapor bubbles lift the liquid water up a tube to the top of the coffee maker. The check valve prevents back flow of the water in the coil. As the water is boiled out of the tube, water from a reservoir is gravity fed past the check valve to the heating coil thereby repeating or continuing the water heating cycle.

Commercially, batch type electrochlorinators are used to convert salt in a brine solution into sodium hypochlorite for the purpose of treating water. Such a device, in a carafe form is sold commercially by Cascade Design, Inc. Seattle, Wash. and is known as the SE200. The SE200 is powered from a separate 12 VDC source such as a car battery. The source of power can also be a solar panel, or line power converted to 12 VDC. To generate the brine to place in the device, the instructions call for using a measuring cup (provided with the device) to pour into the carafe, then to add water and stir until the salt is dissolved. The process of making the brine from dry salt can be time consuming and is another step that the operator has to use to complete the process.

DESCRIPTION OF THE INVENTION

The present invention provides an oxidant production apparatus, an example embodiment of which comprises a water container configured to accept and retain a volume of water; a porous salt container configured to accept and retain a quantity of salt, mounted with the water container such that salt in the salt container is in fluid communication with water in the water container; an electrolysis system mounted with the water container; and a gas directing element mounted with the salt container and the water container such that gas generated by the electrolysis system is preferentially directed through the salt container. In operation, gas from electrolysis percolates through the water and the salt, agitating the salt and encouraging the salt to fully dissolve.

An example embodiment of the present invention provides an oxidant production apparatus, comprising: a water container configured to accept and retain a volume of water; a porous salt container configured to accept and retain a quantity of salt, mounted with the water container such that salt in the salt container is in fluid communication with water in the water container; and an electrolysis system mounted with the water container such that gasses produced by the electrolysis system are encouraged to pass through the salt container. An example embodiment can further comprise a gas directing element mounted with the salt container and the water container such that gas generated by the electrolysis system is preferentially directed through the salt container. In an example embodiment, the gas directing element can comprise a hollow structure having a first cross-sectional area near the electrolysis system and a second cross sectional area near the salt container, wherein the second cross-sectional area matches a cross-sectional area of the salt container. In an example embodiment, the first cross-sectional area can be greater than the second cross-sectional area.

An example embodiment can further comprise a control system configured to determine when the total power consumed by the electrolysis system reaches a predetermined value. In an example embodiment, the water container can have an open top, wherein the salt container mounts with the top of the water container such that gas escaping through the open top must pass through the salt container. In an example embodiment, the water container can have an open top, wherein the salt container mounts with the top of the water container such that gas escaping through the open top must pass through the salt container.

In an example embodiment, the water container can have an open top, and the salt container can comprise (a) a mounting element that engages the water container in a position relative to the water container such that salt in the salt container is in fluid communication with water in the water container, and (b) a gas directing element extending below salt in the salt container and defining a wall surrounding an inner open passage, wherein the passage has a cross-sectional area near the salt in the salt container that is no larger than the cross-sectional area of the salt, and has a cross-sectional area distal from the salt in the salt container that is large enough to capture 50% or more of any gasses generated by the electrolysis system.

An example embodiment can further comprise an inverted funnel type device residing in the water container, said inverted funnel residing over the electrolysis system such that gas generated from the electrolysis system rises in the inverted funnel and agitates salt in the salt container. An example embodiment can further comprise a hollow pipe type device mounted with the water container, said hollow pipe type device mounted with the water container over the electrolysis system such that gas generated from the electrolysis system rises in said hollow pipe device and agitates salt in the salt container.

BRIEF DESCRIPTION OF DRAWINGS

The accompanying drawings, which are incorporated into and form a part of the specification, illustrate example embodiments of the present invention and, together with the description, serve to explain the principles of the invention. The drawings are only for the purpose of illustrating a preferred embodiment of the invention and are not to be construed as limiting the invention. In the drawings.

MODES FOR CARRYING OUT THE INVENTION AND INDUSTRIAL APPLICABILITY

Figure 1:
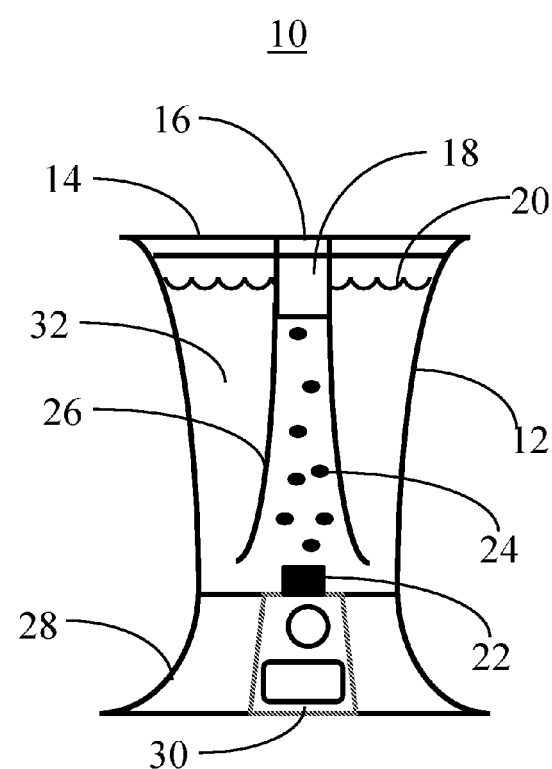
FIG. 1 is a schematic illustration of an example embodiment of the present invention.

Referring to FIG. 1, the present invention relates to disinfection system 10 or other brine containing device that comprises carafe 12 and base 28 and utilizes funnel 26 to collect gasses 24 generated from the electrolysis of brine 32 to create turbulence that automatically mixes water with salt solution 18 to mix brine 32 for the process. In this manner, the brine generation process is automated and simplified for the operator.

Figure 2:
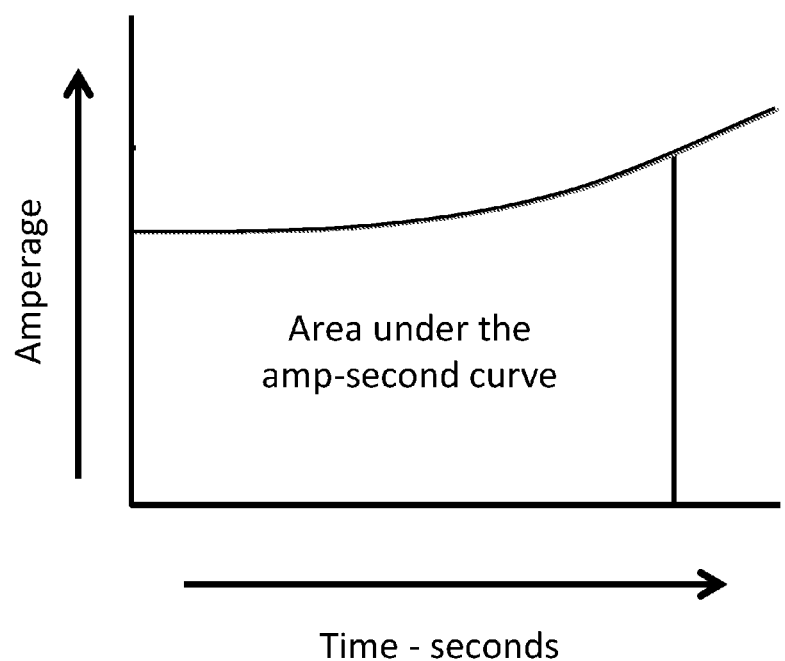
FIG. 2 is a depiction of the amp-second curve of an electrolysis system suitable for use in the present invention.

For electrolytic technology to be successful in many developing countries processes need to be as simple as possible and avoid as much confusion as possible. Carafe device 12 can comprise a variety of sizes and shapes, and can be a portable device, or one fixed in position for a specific application. For example, carafe 12 can be mounted on a counter in a hospital, cruise ship, or other such facility. In a fixed configuration, a valve can be located at the bottom of the device to drain the brine container of liquid. An automated salt dispenser can add more salt of defined quantity to porous salt container 16 and an automated fluid fill line can automatically fill the container with fluid in order to make the process a continuously repeatable batch operation. Gasses 24 generated at electrodes 22 in the center bottom of the carafe flow up to the top of funnel 26 and into porous salt basket 16. To start the process, the operator fills salt basket 16 with salt 18 and then pours water over salt 18 in porous salt container 16 to fill carafe 12 to the top fill line 20. Water initially poured into porous salt container 16 partially dissolves salt 18 to make dilute brine solution 32 in order to begin the electrolysis process. As the electrolysis process proceeds, gas 24 and partially concentrated brine flows up to porous salt container 16 and continues to dissolve salt 18 in porous salt container 16. The gas lift circulation process also circulates the fluid and promotes uniform brine concentration in carafe 12. The concentration of brine 32 in the process will not be uniform until all of salt 18 is dissolved. Low concentration brine will result in production of sodium hypochlorite at a lower rate of production. However, a control circuit, for example mounted in base 28 can measure total current flow to brine solution 32 over a period of time, in amp-seconds as shown in FIG. 2. When the correct amount of amp-seconds has been accumulated (integrated) over time, the correct amount of disinfection will have been made to the correct concentration. At that point, electrolysis ceases.

When the appropriate amount of total power has been applied to brine solution 32 and converted brine solution 32 to sodium hypochlorite or mixed oxidants, the desired final concentration of sodium hypochlorite or mixed oxidants will be achieved, and the control circuit (also known as a controller) can terminate the operation. The invention accordingly provides a simpler process in the field that does not require manual mixing of the salt and water solution to make brine prior to introduction to carafe 12. This process is simpler and easier for the operator in the field. By simply adding dry salt to porous salt container 16, and then filling carafe 12 to top water fill line 20, the only thing left for the operator to do is activate an 'on' switch on control panel 30. The process then proceeds automatically until complete. Another advantage of the current invention over the prior art is that a separate measuring cup for salt is not needed. Porous salt chamber 16 holds the correct amount of salt 18 for one carafe 12 load, and the process proceeds automatically. In the prior art, a separate measuring cup is subject to being lost, damaged, or pilfered.

Figure 3:
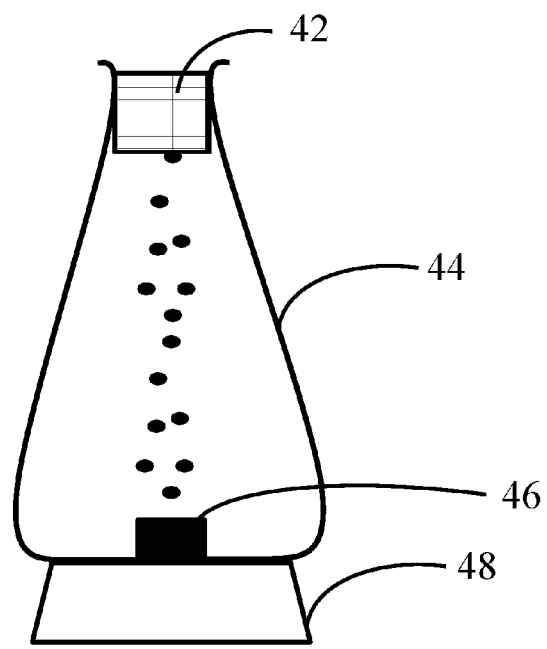
FIG. 3 is a schematic illustration of an example embodiment of the present invention.

In an alternate example embodiment of the present invention shown in FIG. 3, carafe system 40 comprises carafe housing 44, control base 48, electrodes 46, and salt basket 42 that is either permanently attached to carafe housing 44, or removable. Gasses generated by electrodes 46 percolate upward and enter salt basket 42 and mix with the salt to dissolve the salt in salt basket 42. The dissolved salt then enters the volume of fluid in carafe housing 44 thereby becoming electrolyte for electrolysis at electrodes 46. Salt basket 42 also acts as a filter for water that is poured into carafe housing 44 which is necessary to begin the process along with adding a salt, commonly sodium chloride salt, into salt basket 42. Once the salt and water have been added, the electrolysis process can be started by activating a control button on control base 48.

Figure 4:
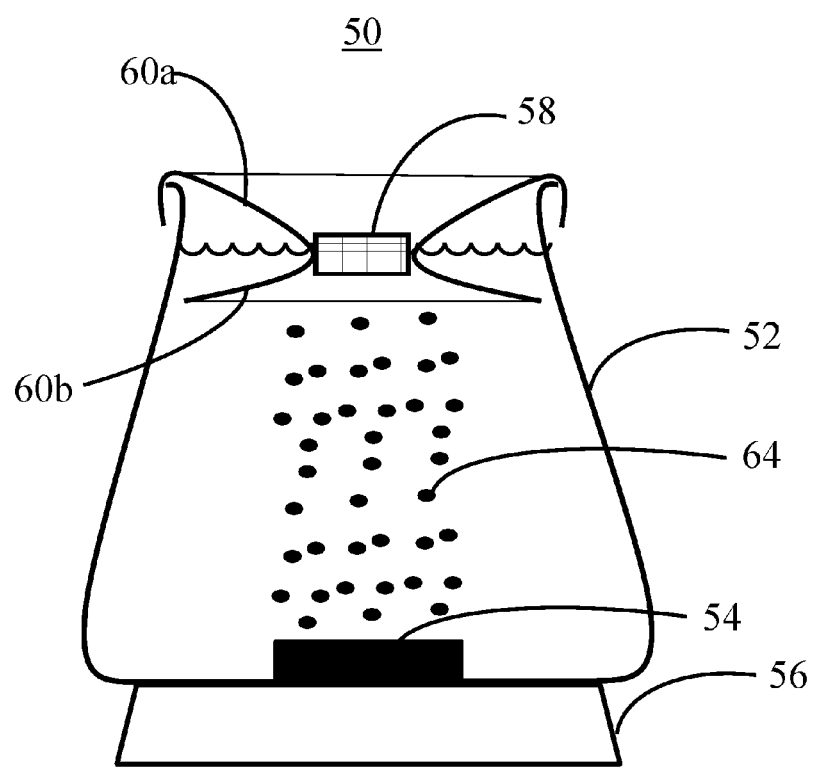
FIG. 4 is a schematic illustration of an example embodiment of the present invention.

In another example embodiment of the present invention shown in FIG. 4, large carafe container 50 comprises carafe housing 52, electrodes 54, control unit 56, salt basket 58 and diversion device 60. Salt basket 58 and diversion device 60 can be an integral unit or can be separable. Diversion device 60 is placed on top of carafe housing 52. To begin the operation, a salt, commonly sodium chloride salt, is added to salt basket 58. Water is then poured in the top of diversion device 60 through salt basket 58 thereby partially dissolving the salt. Diversion device 60 is a solid material and funnel in shape and directs all water poured in the device through salt basket 58. The water poured into the device does not necessarily have to be clean water. When electrolysis occurs, the concentration of oxidant in carafe container 50 will be very high concentration and will oxidize and destroy any pathogens that may be in the water that is used in carafe container 50. If very dirty water is used as the makeup water in carafe container 50 then salt basket 58 can also serve as a rough filter to remove any large particles from the raw water as the water enters carafe container 50. When water and salt have been added to large carafe container 50, electrolysis can be activated by a button on control panel 56. Gas bubbles are formed at electrodes 54 and rise in carafe system 40 until the bubbles impinge on the bottom of, and enter salt basket 58. Bubbles can be funneled by upward funnel surface 60b of diversion device 60 so that all of the bubbles can enter salt basket 58 thereby facilitating dissolution of the salt in salt basket 58.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

The invention claimed is:

1. An oxidant production apparatus, comprising:
   (a) a water container configured to accept and retain a volume of water;
   (b) a porous salt container configured to accept and retain a quantity of salt, mounted with the water container such that salt in the salt container is in fluid communication with water in the water container;
   (c) an electrolysis system mounted with the water container such that gasses produced by the electrolysis system are encouraged to pass through the salt container;
   (d) a gas directing element mounted with the salt container and the water container such that gas generated by the electrolysis system is preferentially directed through the salt container, wherein the gas directing element comprises a hollow structure having a first cross-sectional area near the electrolysis system and a second cross sectional area near the salt container, wherein the second cross-sectional area matches a cross-sectional area of the salt container, wherein the first cross-sectional area is greater than the second cross-sectional area.

2. An oxidant production apparatus as in claim 1, further comprising a control system configured to determine when the total power consumed by the electrolysis system reaches a predetermined value.

3. An oxidant production apparatus as in claim 1, wherein the water container has an open top, and wherein the salt container mounts with the top of the water container such that gas escaping through the open top must pass through the salt container.

4. An oxidant production apparatus, comprising:
   (a) a water container configured to accept and retain a volume of water;
   (b) a porous salt container configured to accept and retain a quantity of salt, mounted with the water container such that salt in the salt container is in fluid communication with water in the water container;
   (c) an electrolysis system mounted with the water container such that gasses produced by the electrolysis system are encouraged to pass through the salt container; and
   (d) an inverted funnel type device residing in the water container, said inverted funnel residing over the electrolysis system such that gas generated from the electrolysis system rises in the inverted funnel and agitates salt in the salt container.

5. An oxidant production apparatus as in claim 4, further comprising a control system configured to determine when the total power consumed by the electrolysis system reaches a predetermined value.

6. An oxidant production apparatus as in claim 4, wherein the water container has an open top, and wherein the salt container mounts with the top of the water container such that gas escaping through the open top must pass through the salt container.

* * * * *